(No Model.)
S. GISSINGER.
VELOCIPEDE.
No. 429,344. Patented June 3, 1890.
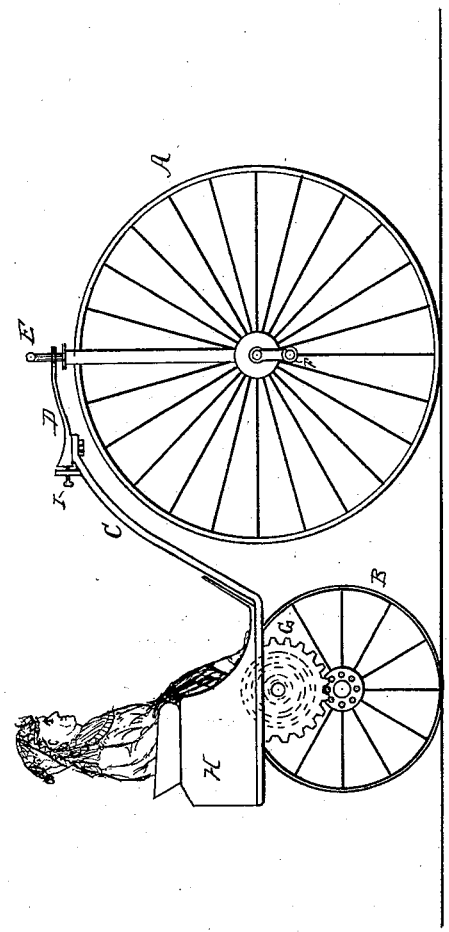
Witnesses:
Alfred H. Jones.
J. J. Arnold
Inventor.
Samuel Gissinger
By A. R. Johnston
Attorney

UNITED STATES PATENT OFFICE.

SAMUEL GISSINGER, OF PITTSBURG, PENNSYLVANIA, ASSIGNOR OF ONE-HALF TO GEORGE W. GOSSER, OF SAME PLACE.

VELOCIPEDE.

SPECIFICATION forming part of Letters Patent No. 429,344, dated June 3, 1890.

Application filed August 23, 1889. Serial No. 321,773. (No model.)

*To all whom it may concern:*

Be it known that I, SAMUEL GISSINGER, of Pittsburg, in the county of Allegheny and State of Pennsylvania, have invented a new and useful Improvement in Combined Bicycle and Vehicle; and I do hereby declare the following to be full, clear, and exact description thereof.

My invention relates to an improvement in velocipedes; and it consists in arranging upon the lower portion of the backbone of the velocipede and over the axle of the hindmost wheels a buggy seat or body.

My invention also consists in connecting to the axle of the hindmost wheels a motor consisting of clock-gear.

To enable others to make and use my invention, I will proceed to describe its construction and operation.

In the drawing, which shows a side elevation, A represents the front wheel, and B the hindmost wheels, connected together by the backbone C.

D is the saddle, E the steering-handles, and F the treadles, all of which are of ordinary construction.

On the rear ends of the backbone C and over the axle of the wheels B, I secure a buggy-body H.

G represents a motor consisting of clockwork and operates on the axle of the wheels B by means of suitable gear-wheel.

The operation is as follows: A man or boy seats himself in the saddle D, and holding the handles E operates the treadles F by means of his feet, and thus propels the vehicle. Small children or packages can be carried in the buggy portion H. Should the weight be too heavy, the clock-gearing can be wound up, and through the medium of its power considerable aid can be given to the man or boy in the saddle.

What I claim is—

A velocipede, substantially as described, consisting of the vertical steering-fork, the front wheel provided with the cranks and pedals, the rear axle, the carrying-wheels, the backbone having the saddle and connected at its front end to the steering-fork, a body at the rear end of the backbone and arranged over and supported by the rear axle, and a spring-motor carried by said body and geared directly to the rear axle, whereby the power of the motor can be utilized to drive the rear axle and aid the rider in propelling the vehicle, as set forth.

In testimony whereof I have hereunto set my hand this 17th day of July, A. D. 1889.

SAMUEL GISSINGER.

Witnesses:
A. C. JOHNSTON,
ALEX. M. JOHNSTON.